United States Patent [19]

Van Kuijk

[11] Patent Number: 5,126,099
[45] Date of Patent: Jun. 30, 1992

[54] BOILING WATER REACTOR PLANT WITH HYBRID PRESSURE CONTAINMENT COOLING SYSTEM

[75] Inventor: Rudolf M. Van Kuijk, Cupertino, Calif.

[73] Assignee: General Electric Company, San Jose, Calif.

[21] Appl. No.: 660,309

[22] Filed: Feb. 25, 1991

[51] Int. Cl.⁵ .................................................. G21C 9/00
[52] U.S. Cl. ...................................... 376/283; 376/298
[58] Field of Search ............... 376/283, 282, 298, 299; 976/DIG. 140, DIG. 142

[56] References Cited

U.S. PATENT DOCUMENTS 5,059,385 10/1991 Gluntz et al. ...................... 376/282

Primary Examiner—Brooks H. Hunt
Assistant Examiner—Frederick H. Voss
Attorney, Agent, or Firm—Robert R. Schroeder

[57] ABSTRACT

A nuclear energy plant housing a boiling water reactor utilizes an isolation condensers with nearly horizontal condenser tubes for both isolation condenser (IC) mode and passive containment cooling system (PCCS) mode, which is entered in response to a loss-of-coolant accident (LOCA). These tubes extend between a cylindrical distributor and a cylindrical collector. In either mode, the reactor vessel is coupled to the cylindrical distributor. Steam reaching the condenser is condensed to water, which flows back to the vessel, providing a cooling effect. In PCCS mode, gas exiting the tubes is trapped and diverted into a wet well. This diversion path is not avialable in IC mode. As a result water exits the tubes more slowly in IC modes in PCCS mode. The water remaining in the tubes during IC mode renders the condenser less efficient. This lower efficiency partially offsets the greater heat exchange in IC mode due to higher temperature differentials and the relatively absence of noncondensable gases. Accordingly, a larger percentage of the condenser area used during PCCS mode can also be used during IC mode. This amounts to a relatively thorough hybrid utilization of the condenser. The result is a dual-function condenser that is smaller, less expensive, more reliable, and more easily maintained than alternative dual-function condensers.

4 Claims, 3 Drawing Sheets

BOILING WATER REACTOR PLANT WITH HYBRID PRESSURE CONTAINMENT COOLING SYSTEM

BACKGROUND OF THE INVENTION

The present invention relates to nuclear reactor plants and, more particularly, to pressure containment cooling systems for such plants. A major objective of the present invention is to provide for simplified pressure containment cooling and heat removal for a boiling water reactor plant both in isolation condensor (IC) mode and in a passive containment cooling system (PCCS) mode, which can be triggered by a loss of coolant accident (LOCA).

Full utilization of nuclear energy awaits the development of nuclear reactor plants that resolve safety issues at reasonable cost. A typical nuclear reactor generated heat through the fissioning of a core containing nuclear fuel. This heat is transferred from the core by a collant that circulates in a reactor vessel containing the core. The heated fluid is directed to a transducer to convert the energy into an alternative form. For example, the heated fluid can be used to drive a turbine, which in turn drives a generator to produce electricity.

Safety standards for nuclear reactors require an ability to handle predefined hypothetical accidents. A nuclear reactor plant should be able to respond to a LOCA, such as would result from a break in a conduit carrying coolant to or from the reactor. As a further precaution, the plant should be able to prevent radioactive release to the environment even when an active safety system fails during a LOCA. Thus, the PCCS mode should be able to function without human intervention or assistance for at least 72 hours after a LOCA.

Loss of coolant causes the temperature in the reactor to rise, boiling remaining coolant and causing the pressure in the reactor vessel to rise. The excess steam so generated escapes into the dry well in which the vessel is situated. The dry volume is much greater than that of the vessel, so this escape results in a considerable pressure relief. Under normal conditions, the dry well is filled with a nonreactive gas such a nitrogen of air. After a LOCA, the stream escaping from the reactor vessel increases the dry well pressure. This pressure accumulation is undesirable since excessive pressure increases the probability that radioactive gases might be forced into the environment.

The increasing dry well pressure forces open a passage to a wet well, which is a large chamber containing a "supression" pool of water. Some of the dry well gas, including the steam, escapes into the wet well. This reduces the dry well pressure. The water in the wet well condenses stream, keeping the wet well pressure low.

Within minutes after a LOCA, a gravity-driven coolant system (GDCS) dumps another pool of water into the reactor to help cool the core. This added water is then converted to stream which increases pressure in the vessel and dry well again. This pressure can be relieved by escape into the wet well. However, as the internal pressure of the wet well increases, its ability to relieve pressure in the dry well decreases. The capacities of the GDCS and the wet well are designed to handle the demands of the plant for the critcal first fifteen minutes or half hour of PCCS mode operation. After this time, the GDCS is exhausted and the port between the wells remains closed to further gas evacuation. The port is closed since the pressure differential between the wells no longer displaces the water covering the port.

The GDCS coolant slows the rate of stream generation and decreases the pressure in the vessel and dry well. When the pressure in the dry well falls below that of the wet well by a threshold differential amount, a vacuu, breaker releases gases from the wet well to the dry well. This clamps the pressure differential of the wet well to the predetermined level above that of the dry well.

While these measures address short-term pressure accumulation, there is a need to handle longer term effects of decay heat. While controls rods are inserted soon after the onset of a LOCA to reduce core reactivity, core heat generation decreases only gradually. The heat produced during this decrease is termed "decay heat". For a period beginning a few minutes after the LOCA and extending over a period of about three days before human-assisted maintenance activities will be begun this decay heat must be dissipated. Otherwise, over time, the deacy heat might result in excessive pressure accumulation through boiling of coolant from the GDCS.

To mitigate this long-term pressure accumulation, a heat exchanger can be used to remove heat, and thereby pressure, from the vessel and dry well. The heat exchanger can transfer heat from the fluid from the reactor to a "condenser" pool of water. Unlike the suppression pool in the wet well, the condenser pool can be vented to the environment so that its temperature does not substantially exceed 100° C. Thus, the cooling effectiveness of this heat exchanger can be maintained over a period of days. To provide redundancy, several such heat exchangers can be required.

One of the paradoxes facing the nuclear industry is that each system introduced to enchance the safety of a plant adds another component that can fail. In addition, each system adds to the volume and complexity of a plant. Since plant costs scale dramatically with plant volume, plant costs can be severely and adversely affected by the extra volume consumed by safety systems. In addition, complexity can adversely affect both cost and reliability. What is needed is a heat exchanger for dissipating decay heat in PCCS mode that adds minimal volume, complexity and cost to a reactor plant.

SUMMARY OF THE INVENTION

In accordance with the present invention, the isolation condenser of a nuclear power plant also serves as the heat exchanger for dissipating decay heat during PCCS mode. This heat exchanger employs condenser tubes with slightly negative slopes so that it automatically adjusts to the different requirements of IC mode and PCCS mode. The invention is not applicable to boiling-water reactors (BWRs). However, the present invention also applies to other dual-phase reactor system in which vapor of the coolant is used to convey energy from a reactor.

An isolation condenser serves to dissipate heat during IC mode, which is entered in normal plant operation in the event of certain malfunctions. IC mode can occur when the turbine needs to be shutdown temporarily, for example, due to a short circuit in the electric generator driven by the reactor plant turbine or other transducer for converting energy stored in the heat transfer-vapor into another form of energy. The reactor steam output is diverted to the isolation condenser, which condenses the stream and returns it to the reactor pressure vessel. By this action, the pressure will not exceed the set point of the sagety relief valves on the reactor pressure vessel. IC mode is maintained either until the turbine is back "on line" or until the reactor can be shut down.

The challenge in using a heat exchanger both for IC mode and PCCS mode is these impose very different demands on the heat exchanger. In particular, this functional combination is problematic because the heat-capacity requirements of the two modes are quite different. The temperatures, pressures, and durations differ greatly between the modes. Moreover, the PCCS mode is characterized by the substantial presence of noncondensables, such as nitrogen, that are essentially absent during IC mode. These noncondensables impair the heat exchange function.

The net effect of these differences is that the heat transfer surface area required during PCCS mode substantially exceeds that required for IC mode. Obviously, a heat exchanger designed to handle both situations must have the surface area to accommodate the more demanding situation, i.e., a LOCA. This approach results in an excess heat exchange capacity for IC mode. This excess capacity can cause heat and pressure to decrease too rapidly. Temperature changes of more than 50° C/hour, induce unacceptable thermal stresses on the reactor pressure vessel. These stresses fatigue the vessel and shorten its life span.

The present invention approaches the different requirements for PCCS mode and IC mode by varying the efficiency of an isolation condenser according to conditions. This variation occurs inherently as a result of the nearly horizontal layout of the condensor tubes. The tubes are partially filled with water and partially filled with gas, which can include steam and noncondensable gas. The greater turbulence of the steam renders the wall portions adjacent to the steam more effective at heat transfer than are the wall portions adjacent to the water. By varying the amount of water in the nearly horizontal tubes, their heat-transfer efficiency can ve varied.

Accordinggly, during PCCS mode, the tubes are constantly flushed by the action of noncondensable gases due to the difference in pressure between the dry well and the wet well. During IC mode, water is at most weakly flushed and so remains longer in the tubes to reduce their efficiency. The reduced efficiency implemented in IC mode slows the cooling rate to minimize thermal stresses on the reactor pressure vessel.

The relative efficiency of an isolation condenser can be determined by appropriate selection of condenser tube lengths, diameters and slopes. In other words, the present invention provides a designer a measure of flexibility that can be used to fine tune the characteristics of a plant. In the prior art, isolation condensers had verical condenser tubes. These do not provide the variable efficiency. Slight variation of vertical slope do not afford a designer useful control of performance.

The present invention provides several other advantages over the prior art. For, example, the distributor and collector can be cylindrical so as to handle pressure variations effectively. In the prior art, the distributor and collector had flat plates through which the condenser tubes extended. These plates had to be made thick to withstand the pressure differentials between the interior of the condenser and the isolation pool. These thick plates are subject to greater temperature gradients and thus to greater thermal stresses, reducing reliability. The present invention uses cylindrical walls which can be thinner, less subject to large temperature gradients, and thus less subject to thermal stresses. As a result, the present invention provides an isolation condenser which is more reliable and, in part because it is smaller and lighter, easier to maintain. The savings in condenser size result in a significant savings in plant size and cost. These and other features and advantages of the present invention are apparent from the description below with reference to the following drawings.

DESCRIPTION OF THE PREFERRED EMBODIMENTS

Figure 1:
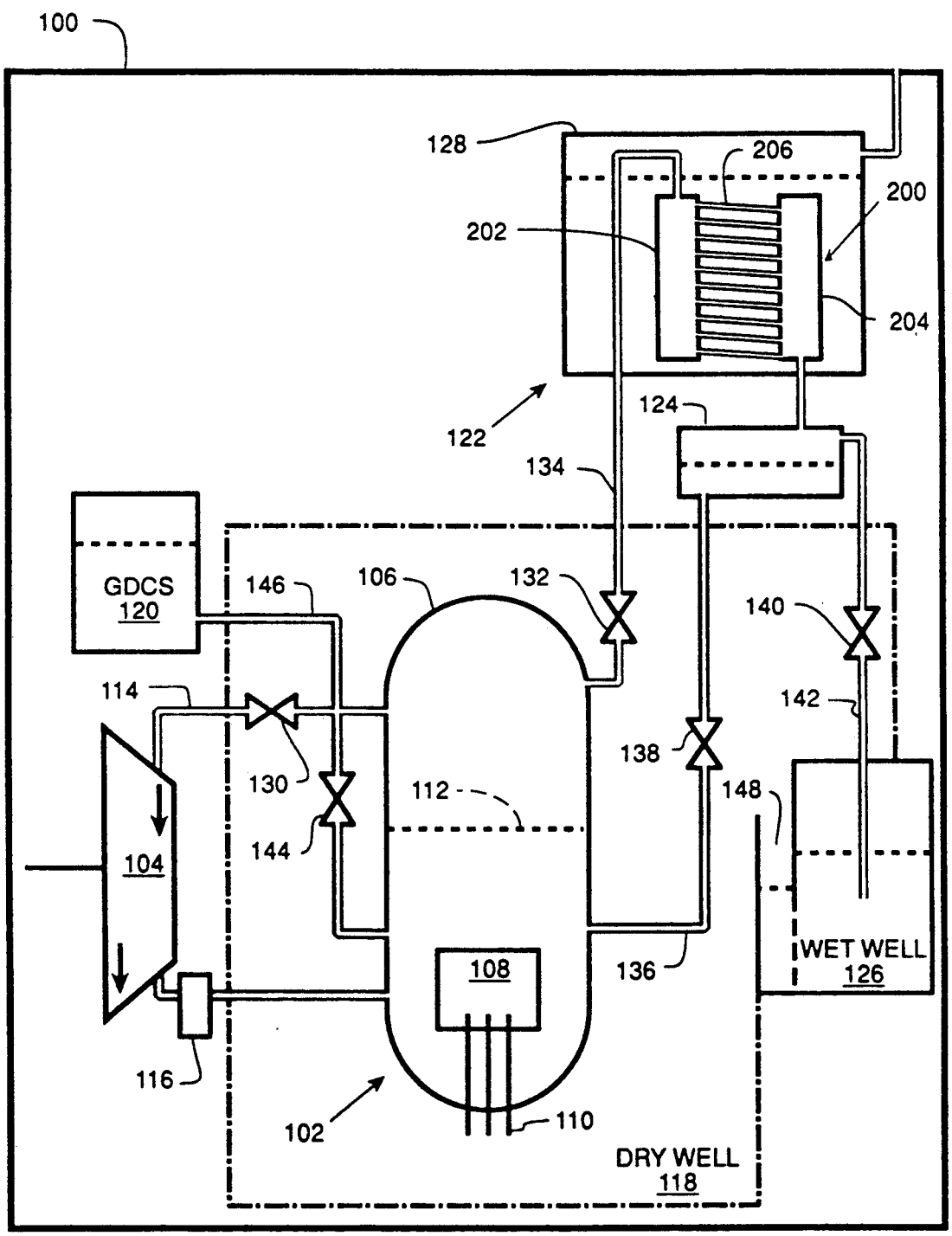
FIG 1 is a schematic elevation view of a nuclear reactor plant in accordance with the present invention.

A nuclear reactor plant 100 comprises a nuclear reactor 102 and a turbine 104 to be driven by reactor 102, as shown in FIG. 1. The turbine is used to deive a generator to generate electricity. Reactor 102 includes a reactor vessel 106 and its internals, including a fissionable core 108. the activity of core 108 is regulated by inserting and withdrawing control rods 110. Reactor 102 contains water, up to nominal level 112, and steam. The water circulates up through core 108 to transfer heat therefrom. Steam resulting from this heating exits vessel 106 via a turbine steam conduit 114. This steam condenses as it drives turbine 104, and the resulting condensate returns to vessel 106 via a feedwater conduit system 116.

Several components of plant 100 are employed in PCCS mode. A dry well 118 is used to alleviate an initial surge of pressure. A gravity driven coolent system (GDCS) 120 is used to at least temporarily replenish coolant lost from vessel 106. Condenser system 122 is used to dissipate heat and perssure during the decay period after a LOCA. Gas/water separator 124 assists in the removal of noncondensable gases from a dry well 118 in which reator 102 is situated.

Condenser system 122 comprises a condenser chamber 128 and an condenser 200 submerged in the pool of water contained in chamber 128. Condenser 200 includes a distributor 202, a collector and a plurality of condensor tubes 206 extending therebetween. Distributor 202 serves to distribute incoming steam amoung tubes 206. Tubes 206 serve as heat exchange media, causing steam therein to condense. Collector 204 gathers the condensate, uncondensed steam and non-condensible gases, for delivery to gas/water separator 124. In accordance with the present invention, condenser tubes 206 have a slight downward slope, which is exaggerated in FIG. 1.

During normal operation, a turbine valve 130 and a condenser valve 132 are open. During IC mode, condenser valve 132 stays open while turbine valve 130 is closed, diverting steam that would have driven turbine 104 through condenser conduit 134 to condenser 200. Condensate from condenser 200 flow into gas/water separator 124, and back to vessel 106 via isolation return conduit 136 and valve 138, which is open during IC mode. A vapor valve 140 remains closed during IC mode.

Operation in PCCS mode is similar, but vapor valve 140 is opened in PCCS mode, but not during IC mode. Opening valve 140 permits vapor, especially noncondensables, to tranfer from gas/water separator 124 via conduit 142 to wet well 126. Also in PCCS mode, and not during IC mode, a GDCS valve 144 is opened allowing water from gravity driven coolant system 120 to flow through a conduit 146 to vessel 106.

Figure 2:
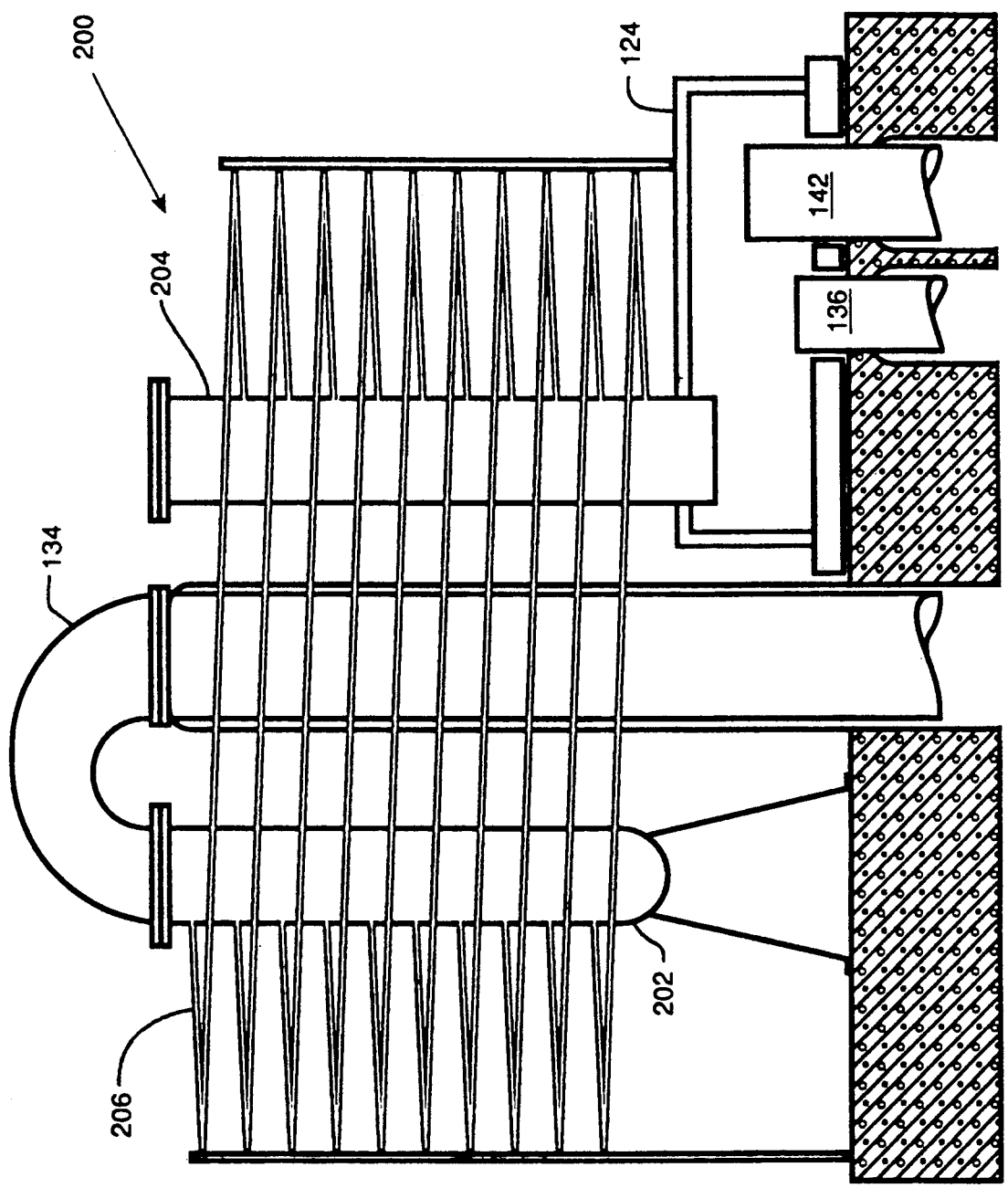
FIG. 2 is a schematic elevation view of an isolation condenser of the plant of FIG. 1.
Figure 3:
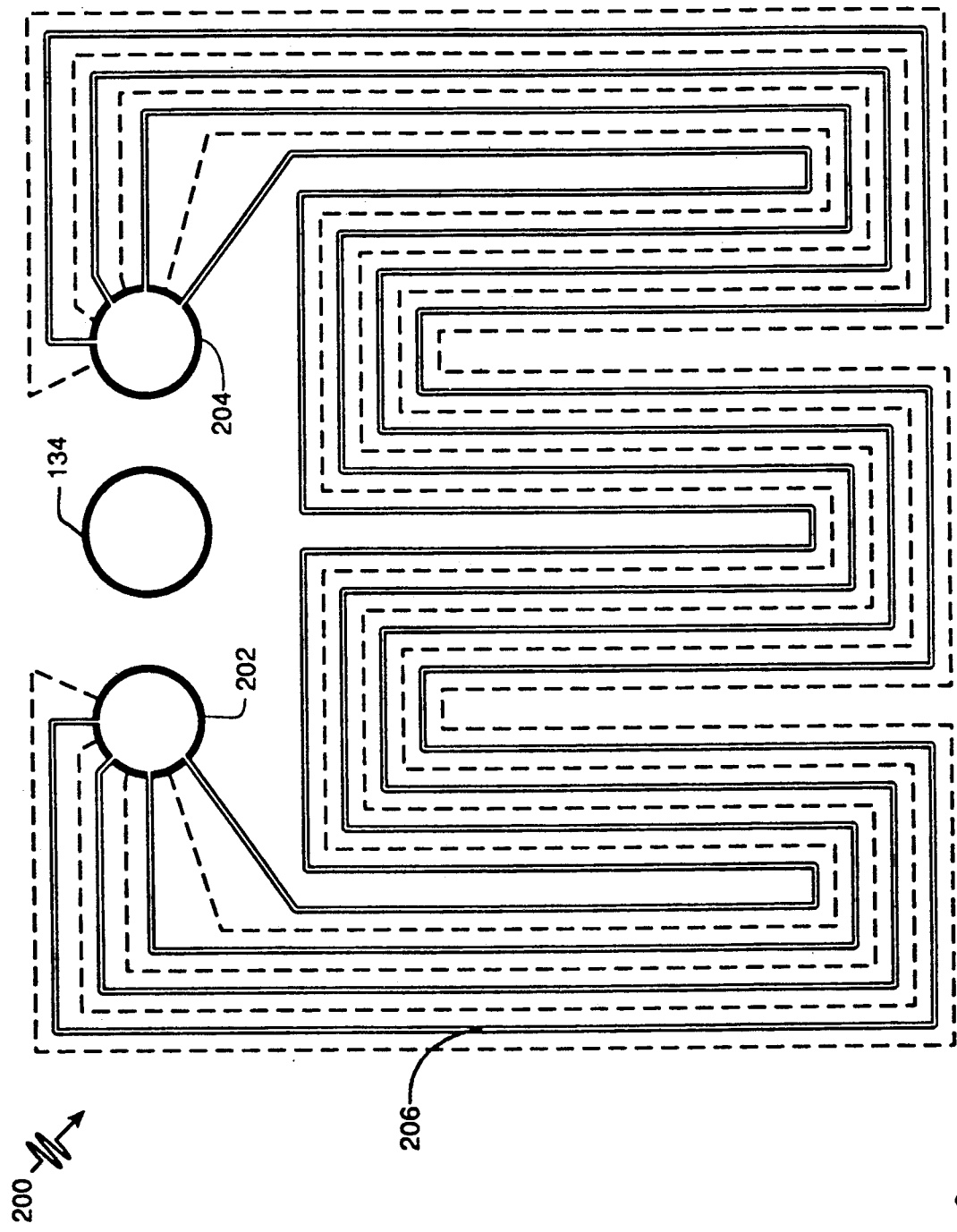
FIG. 3 is a schematic plan view of the isolation condenser of FIG. 2.

Condenser 200 is represented in greater detail in FIGS.2 and 3. Condenser 200 includes 116 tubes 206 arranged on 29 levels of 4 tubes each. For clarity, only ten tubes, each on a different level, is shown in FIG. 2. The configuration of four tubes 206 for the top or first level is shown in FIG. 3. the next level down is represented by dotted lines. Succeeding levels emulate the first and second layers in alternation. The primary reason for the illustrated staggering is to allow more room for connecting the large number of tubes to distributor 202 and collector 204. Additionally, the staggering facilitates convertion in the condenser pool, providing for better secondary heat transfer.

Plant operation during IC and PCCS modes are contrasted to demonstrate the differential efficiency of isolation condenser 200 in the two circumstances. During IC mode, the primary force driving condensate through tubes 206 is gravity. Since the negative slopes of tubes 206 are slight, the effect of gravity is weak. In addition, there is a small pressure differential between disributor 202 and collector 204. Combined, these forces only weakly drive condensate in tubes 206. Accordingly, a relatively large amount of condensate remains in tubes 206 during IC mode. This condensate lowers the heat transfer efficiency of tubes 206. this lower efficiency partially compensates for additional heat transfer made possible by the greater temperature differentials associated with IC mode.

In PCCS mode, vessel 106 is treated as breached so that the pressures and temperatures are equalized inside and out. The gases is distributed over the entire dry well, so the pressure driving vapor to condenser 200 is much less than in IC mode. However, wet well valve 140 is open. The pressure in dry well 118 is expected to be greater than that in wet we 126, as indicated by the differential water levels within wet well 126 and within the channel 148 between the wells. The pressure differential between the wells is available to drive fluid through condenser 200. In particular, noncondensable gases, which are relatively prevalent during PCCS mode, serve to drive condensate out of tubes 206. Thus, relatively little tube area is covered with water, so tubes 206 transfer heat relatively efficiently. This efficiency partially offsets the relative low temperature differentials between the fluids in the interior and exterior of condenser 200.

For condenser 200, there are 116 tubes arranged in 29 planes. Within a plane, the tubes are maintained at a pitch of 90 mm. This results in a width (left to right in FIG. 3) of 2.07 meters (M). A somewhat longer length of 2.350 M is required to accommodate the distributor and collector. the planes are arranged on a pitch of 50 mm, yeilding a bundle height of about 1.450 M. The tubes have a common inner diameter of 27 millimeters (mm) and a common outer diameter of 32 mm. The total bundle surface area is about 137 $M^2$. The slope is less than 1:10 and, more specifically, about 1:100 downward.

By varying the heat transfer efficiency of tubes 206 according to mode, the heat transfer capacity required for PCCS mode and the heat transfer limits required in IC mode can both be met. The efficiency difference can be adjusted by selected different lengths, wall thicknesses, diameters, and slopes for the condenser tubes. In general, it is not possible for these design options to entirely compensate for the pressure and differences beetween the PCCS and IC modes. Thus, it will be generally necessary to provide additional capacity for PCCS mode. Foe example, of three condensers made available for PCCS mode, only one would be used for IC mode. While this is not ideal, this is a substantial improvement over a 9:1 ratio that might be required if the present invention were not practiced.

the specifications for tubes 206 are based on the formular:

$$Q = \Delta T \cdot A \cdot \alpha$$

where Q is the heat transfer rate associated with the tubes, $\Delta T$ is the temperature difference between the reactor coolant in the interior of the tubes and condenser pool water exterior to the tubes, A is the area of the tubes available for heat transfer, and $\alpha$ is the heat transfer coefficient of the tubes.

Reactor plant 100 is comparable to the reactor plant at Dodewaard. During normal plant operation, the interior of reactor vessel 106 attains 290° C. and 75 atmos pool is maintained at about 20° C. as long as condenser 200 is not heating the pool. Pressure in the nitrogen-filled dry well is about 1 bar, and the pressure in the wet well is about 1 bar.

The cooling capacity required for PCCS mode varies according to the nature of the contingency. One standard guidelines is that 1% decay heat needs to be be dissipated. In the present case of a 600 megawatt natural-circulation boiling-water reactor plant, a 1% decay heat is about 5.16 $\times 10^6$ kilocalories per hour (KCal/Hr). A 3.5% decay figure, in this reactor, a heat transfer capacity of 18.06 $\times 10^6$ KCal/Hr is assigned to IC mode.

At the onset of IC mode, the temperature differential at the entrance of the condenser is about 270° C. Due to subcooling of the condensate, this temperature falls to about 150° C. Since the condenser pool is vented, its temperature is clamped at a little above 100° C. This yields a mean $\Delta T$ of about 120° C. Assuming conditions of 1% decay heat one hour after a LOCA, a $\Delta T$ of about 25° C. can be assigned to PCCS mode. Thus, the $\Delta T$ in IC mode provides more effective heat transfer than the $\Delta T$ in PCCS mode.

The heat transfer coefficient for the condenser varies by the mass flow of liquid, the amount of noncondensables and the pressure in the tubes. In a vertical design condenser, the heat transfer coefficient can be about 3500 KCal/Hr·$M^2$·C. ($M^2$ =square meters) In a horizontal design in accordance with the present invention, this figure is lower because of the larger volume of water maintained in the tubes. In the illustrated embodiment, the heat transfer coefficent is about 2800 KCal/Hr·$M^{2\cdot°}$C. Further optimization is expected to provide a coefficient of about half that.

In PCCS mode, this coefficient is estimated to be about 500 KCal/Hr·$M^{2\cdot°}$C. this relatively low figure is primarily due to the presence of noncondensables in the tubes. In additon, the lower pressures associated with PCCS mode are associated with lower molecular densities, which result in lower heat transfer rates. In addition, lower fluid velocities result in less turbulence, which also diminishes heat transfer.

Based on the foregoing, a heat transfer surface area of 137 M² is required for PCCS mode heat dissipation. An area of only 53.75 M² is required for IC mode using a horizontal design. An even smaller area, 39.69 M², is required in a conventional vertical design. The isolation condenser must be designed to meet the LOCA requirement of 137 M². Accordingly, the condenser is too big by a factor of 3.47 in a vertical design and by 2.55 in a horizontal design. Rounding up to the nearest integer, the present invention requires three condensers for PCCS mode rather than the four required by the prior art. Further optimization can bring the ratio down to two condensers for PCCS mode for one used in IC mode. This lower ratio takes better advantage of the hybrid function of the condenser.

Optimization is achieved by appropriate selection of design parameters. Heat transfer capacity can be adjusted by varying tube length, the number of tubes and the slope of the tubes. In generally, a smaller negative slope results in less water drainage, greater subcooling, a smaller heat transfer coefficient, a smaller $\Delta T$, and a smaller heat transfer capacity. These and other modifications to and variations upon the described embodiments are provided for by the present invention, the scope of which is limited only by the following claims.

What is claimed is:

1. a reactor plant comprising:
   a containment structure defining a wet well, dry well, an isolation chamber means, a transducer chamber means, said wet well being in fluid communication with said dry well, said wet well and said isolation condenser chamber which contains condenser coolant during normal operation, said isolation chamber means being vented to an external environment, said wet and said dry well being in fluid isolation relative to said external environment, said dry well containing a noncondensable gas;
   a two-phase reactor, said reactor having a vessel located within said dry well, said vessel containing a heat-transfer fluid during normal operation, said heat-transfer fluid including heat-transfer liquid and heat-transfer vapor, said vessel having a core for converting heat-transfer liquid to heat-transfer vapor;
   a transducer for converting energy stored in heat-transfer vapor into another form of energy;
   tranducer conduit means for conveying heat-transfer vapor to said transducer from said reactor;
   pressure relief means for relieving excessive pressure within said reactor vessel by conveying heat-transfer fluid, primarily heat-transfer vapor, from said vessel to said isolation chamber means in the event of said excessive pressure;
   a condenser having a distributor, a manifold, and a receiver, said condenser being contained in said isolation chamber means, said distributor being coupled to said pressure relief means for receiving heat-transfer fluid, primarily vapor, therefrom and for distributing said heat-transfer fluid to said manifold, said manifold comprising a plurality of tubes submerged in the water contained in said isolation chamber and extending from said distributor to said receiver, said tubes having a mean slope that is downward and has a magnitude less than 0.1;
   separator means for separating liquid from gas so that heat-transfer liquid exiting said condenser can be separated from heat-transfer vapor and noncondensable gas exiting said condenser, said separator means being coupled to said receiver for receiving fluid therefrom;
   condesate return means for conveying heat-transfer liquid from said separator means to said reactor vessel; and
   emergency conduit means for conveying noncondensable gas from said separator means to said wet well during a loss-of-coolant accident.

2. The reactor plant of claim 1 wherein said distributor is generally in the form of a vertically extending tube and said receiver is substantially in the form of a vertically extending tube laterally spaced from said distributor, said distributor and said receiver being substantially coextensive vertically so as to define a common vertical extent.

3. The reactor plant claim 2 wherein said tubes aree arranged in planar groups, the tubes each group sharing a commom entrance height at said distributor and a common exit height at said receiver, tubes of different groups having different entrance heights and different exit heights.

4. The reactor system of claim 1 wherein each of said tubes defines a convoluted path through said condenser coolant.

* * * * *